United States Patent
Wu et al.

(10) Patent No.: US 9,218,830 B2
(45) Date of Patent: *Dec. 22, 2015

(54) MAGNETIC POLE SELF-ANNEALING WITH CURRENT INJECTION IN PERPENDICULAR MAGNETIC RECORDING (PMR)

(71) Applicant: Headway Technologies, Inc., Milpitas, CA (US)

(72) Inventors: Yan Wu, Cupertino, CA (US); Kowang Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,415

(22) Filed: Feb. 26, 2014

(65) Prior Publication Data
US 2015/0243306 A1    Aug. 27, 2015

(51) Int. Cl.
| | | |
|---|---|---|
| *G11B 5/33* | (2006.01) | |
| *G11B 5/31* | (2006.01) | |
| *G11B 5/60* | (2006.01) | |
| *G11B 5/127* | (2006.01) | |

(52) U.S. Cl.
CPC ............ *G11B 5/3163* (2013.01); *G11B 5/1278* (2013.01); *G11B 5/6082* (2013.01)

(58) Field of Classification Search
CPC ............................ G11B 5/3163; G11B 5/3903
See application file for complete search history.

(56) References Cited

U.S. PATENT DOCUMENTS

| | | | |
|---|---|---|---|
| 7,266,880 B2 | 9/2007 | Biskeborn et al. | |
| 7,274,538 B2 | 9/2007 | Thurn et al. | |
| 8,035,930 B2 * | 10/2011 | Takano et al. | 360/319 |
| 8,848,495 B1 * | 9/2014 | Wu et al. | 369/13.33 |
| 8,917,581 B1 * | 12/2014 | Mallary | 369/13.33 |
| 2003/0039081 A1 | 2/2003 | Seigler et al. | |
| 2009/0052092 A1 * | 2/2009 | Zhou et al. | 360/313 |
| 2009/0260719 A1 * | 10/2009 | Iben | 148/122 |

OTHER PUBLICATIONS

"Electroplated 2.4 TESLA CoFe Films," Abstract by Christian Bonhote et al., Oct. 20-25, 2002, 1 pg.
Co-pending US Patent HT13-004, U.S. Appl. No. 14/093,993, filed Dec. 2, 2013, "Plasmon Generator Self-Annealing With Current Injection in TAMR," by Yan Wu et al., 34 pgs.

* cited by examiner

*Primary Examiner* — Jie Yang
*Assistant Examiner* — Xiaowei Su
(74) *Attorney, Agent, or Firm* — Saile Ackerman LLC; Stephen B. Ackerman

(57) ABSTRACT

A main pole structure is selectively annealed by attaching a lead to a back side thereof and electrically connecting a lead to a front end of a narrow pole tip portion such that when a first current passes between the leads there is resistive heating that raises the temperature in the narrow pole tip to 250° C. to 400° C. As a result, defects and stress level are reduced in the narrow pole tip portion without substantially increasing a temperature in adjacent regions including the read head. Annealing may be performed with a partially completed main pole structure or with a completely fabricated write head. Leads may be removed or left in place after annealing is finished. The extent of annealing may be determined by calculating a difference between resistance measurements taken before and after annealing.

20 Claims, 8 Drawing Sheets

MAGNETIC POLE SELF-ANNEALING WITH CURRENT INJECTION IN PERPENDICULAR MAGNETIC RECORDING (PMR)

RELATED PATENT APPLICATION

This application is related to the following: Ser. No. 14/093,993, filing date Dec. 2, 2013; assigned to a common assignee and herein incorporated by reference in its entirety.

TECHNICAL FIELD

The present disclosure relates to magnetic read/write heads, and in particular to a PMR write head and method for forming the same in which a main pole structure is locally heated in a narrow pole tip portion thereof to anneal defects and relieve stress thereby improving magnetic properties.

BACKGROUND

Perpendicular magnetic recording (PMR) has been the prevailing writer technology for state-of-the-art magnetic hard disk drives (HDD). The magnetic pole in a PMR write head has a stringent geometric requirement. The pole thickness cannot be either too thin, a condition that causes pole erasure at remanence, or too thick which results in excessive magnetic flux that induces unwanted erasure at adjacent or far track locations. Furthermore, pole thickness at the air bearing surface (ABS) must be above a certain minimum value to avoid degrading performance in high data rate (HDR) application drives. Pole thickness at the ABS must not be too thick in order to prevent skew angle performance loss due to the different zones in the drive that are known as the inner region (ID), middle region (MD), and outer region (OD). The pole's ABS geometry also needs a bevel angle for the same purpose of guaranteeing its functionality at various skew angles encountered when the head operates at different radii (i.e. inner, mid, or outer) on the disk. These complex geometric shapes have to be fabricated with a high Bs and yet soft magnetic material in order to erase existing data patterns written previously, and replace them with sharp transitions from the new data.

There are generally two ways to fabricate the main pole that are called subtractive and additive methods. In the additive process, the desired geometric shape is created through photolithography followed by reactive ion etching (RIE) or ion beam etching (IBE) to form an opening in an insulation layer. Then, a magnetic material is deposited to fill the opening by either a plating process or a typical dry film deposition process such as ion beam deposition or sputtering. The subtractive process involves first depositing a magnetic film to cover a large area. Subsequently, photolithography and IBE are used to shape the magnetic material into a main pole structure.

With regard to the additive method, plating into a small cavity is a delicate process. Since the magnetic material usually grows from all sides of the cavity wall and meets at the middle of the opening, it is quite common to produce some voids or seam lines where the magnetic material converges at the center of the opening. The resulting void or seam line typically has significant porosity and yields a density and a saturation magnetic moment less than the surrounding bulk material. A similar situation occurs when dry film deposition is used to fill small cavities. In addition, the dry film deposition leaves a substantial residual stress in the film that may degrade the performance of the magnetic layer as observed by higher coercivity and/or lower permeability.

Annealing is usually employed to improve magnetic performance in films with residual stress. For example, C. Bonhote, E. Cooper, L. Romankiw, and H. Xu describe an annealing method in "Electroplated 2.4 Tesla CoFe Films", K2-Seventh International Symposium on Magnetic Materials, Processes and Devices, Oct. 20-25, 2002. In some cases, very high temperature annealing is able to dramatically improve the permeability of magnetic material, particularly for higher frequency applications. However, high temperature annealing is usually not compatible with advanced PMR head designs, especially since the adjacent read head sensor is temperature sensitive. As PMR technology is pushed to higher areal density, the track pitch becomes progressively smaller. A size of less than 50 nm is required in the near future for next generation products. In the additive approach, a void or seam line represents a relatively large feature for small main pole volumes, and especially when the defect is located in the narrow write pole portion adjacent to the ABS.

Thus, there is an urgent need to develop a methodology that can enhance the magnetic integrity of a main pole structure in designs with small track pitch sizes. The new concept for improving write head performance must address the issue of small voids and seam lines in magnetic layers without degrading other components in the PMR write head or in the adjoining read head.

SUMMARY

One objective of the present disclosure is to provide localized heating in a main pole structure in a PMR write head to enable annealing of the main pole magnetic material and thereby provide enhanced magnetic performance without thermally degrading the properties of adjacent components such as the read head.

A second objective of the present disclosure is to provide a method for localized annealing of a main pole structure that is compatible with a PMR write head fabrication process.

These objectives are realized in various embodiments of the present disclosure wherein a PMR write head includes a main pole structure with a narrow pole tip portion at the ABS. The main pole structure may be formed by an additive method wherein a cavity is formed in an insulation layer and has a shape that conforms to the desired shape and dimensions of the main pole structure. A seed layer is formed on the sidewall of the opening in the insulation layer before depositing the main pole magnetic material with a plating method or a dry film process such as ion beam deposition or ion beam sputtering. A chemical mechanical polish (CMP) step may be employed to form a flat top surface on the main pole structure that is coplanar with the adjoining insulation layer.

A key feature of the present disclosure is a design and method used to locally anneal the main pole structure without substantially elevating the temperature in other portions in the recording device. In particular, a temperature that reaches 250° C. to 400° C. is produced and confined to the narrow pole tip portion at the ABS and to a lesser extent, in an adjoining flared (yoke) portion of the main pole structure. The anneal step may be performed before the remaining layers are formed in the PMR write head or after the write head fabrication is completed. To accomplish the localized annealing, a dual main pole structure in a mirror image configuration may be employed wherein two main pole structures are joined head to head at their narrow pole tip portions near a plane that approximates the eventual ABS position. One lead is attached to a back end of the main pole structure that is on one side of the eventual ABS while a second lead is attached to a back end of the main pole structure on the opposite side of the eventual ABS. According to one embodiment, a DC, AC, or pulsed current flows between the two leads and will heat the narrow portion of each main pole structure proximate to the ABS to a substantially higher temperature than the surrounding layers. This result occurs because there is a substantially larger current density associated with a smaller cross-section in the narrow pole tip portions than in other parts of the main pole structures. This step may be performed simultaneously on a plurality of main pole structures in an array of PMR devices by connecting the leads on either side of the eventual ABS together so individual main pole structures form a parallel circuit to increase throughput. Connecting the main pole structures in series is also effective as long as none of the main pole structures connected in series is broken.

According to a second embodiment, one of the two main pole structures in the mirror image design is omitted and a first lead is attached to a narrow pole tip portion proximate to the eventual ABS while a second lead is attached to a back end of the same main pole structure. An injected current flows through the main pole structure and heats the narrow pole tip portion to a substantially higher temperature than the remainder of the main pole structure. In either embodiment, an overcoat layer made of silicon oxide or another insulator material, and with a conformal thickness between 0.05 to 5 micron may be deposited on a plurality of main pole structures after leads are attached but before the annealing step.

According to the first embodiment, a DC, AC, or a pulsed first current is injected via a lead into the first main pole structure and exits from its mirror image main pole structure by a second lead thereby causing resistive heating in the narrow pole tip regions, and a substantially lower conductivity heating in adjoining portions of each main pole structure. The current effectively increases the temperature in the narrow pole tip portions to about 250° C. or higher depending on the cross-sectional area of the narrow pole tip and the current magnitude. A first current of around 30 mA applied for 1 minute up to about 2 hours is sufficient to raise the temperature of the pole tip portions by 250° C. or more assuming a typical temperature coefficient of resistivity (TCR) of a 24 kG high Bs material to be 0.3%/degree C. Meanwhile, in embodiments where a leading shield and side shields are present during the annealing step, the temperature increase in adjacent shields is less than 200° C. even when the narrow pole tip is heated up to 400° C.

In another embodiment, a second current substantially less in magnitude than the first (annealing) current may be injected through a main pole structure and between the leads to obtain a first resistance measurement before the first current is applied. A third current equivalent to the second current is injected through the main pole structure to obtain a second resistance measurement after the annealing step. A difference between the first and second resistance measurements is used to determine the effect of annealing and may provide an estimate of the physical dimensions of the narrow pole tip portions.

Following the anneal step, the overcoat layer may be removed by a selective etch or a CMP process, or partially removed depending on the design and process need. In one embodiment, a $CF_4$ reactive ion etch is used to selectively remove a silicon oxide overcoat but does not attack the alumina insulation layer (side gap) surrounding the main pole structure. The leads may be removed or left in place while a conventional sequence of processes is performed to complete the formation of the PMR write head. In yet another embodiment, the annealing process is not performed until the entire PMR writer head structure is fabricated.

DETAILED DESCRIPTION

The present disclosure relates to a PMR device comprising a combined read head/write head scheme wherein the write head has a main pole structure with a narrow pole tip portion adjoining an ABS. Although the exemplary embodiments depict a main pole structure with a particular design from a top-down view, the annealing method and design of the present disclosure are not limited to a specific main pole shape and may be applied to any main pole shape that has a back end portion also referred to as a yoke, and a narrow pole tip portion at an ABS. Moreover, the annealing method is not limited to an additive manufacturing process but may also be applied to a subtractive process after an initial main pole shape has been formed. For example, the initial main pole structure may be annealed and then a final subtractive shaping process may be performed. Otherwise, localized annealing may be performed (1) after the main pole structure is completely fabricated but before any additional write head layers are formed, or (2) after the write head is completely fabricated. Track width is defined by the width of the trailing edge of the main pole's narrow pole tip along a cross-track direction. Down track is a direction that is orthogonal to the top and bottom surfaces of the main pole. The annealing method and structure described herein are also compatible with a write head or a combined read/write head having one or more of a leading shield, side shields, and a trailing shield. Furthermore, one or both of the leading edge and trailing edge of the narrow pole tip portion may be tapered before or after the annealing process.

Figure 1:
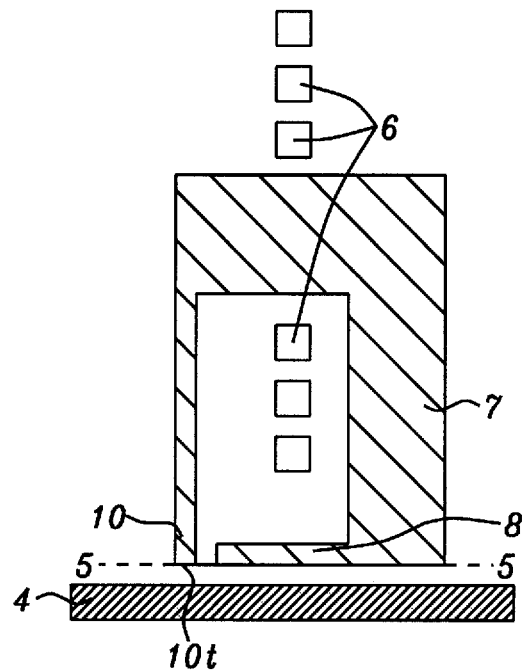
FIG. 1 is a cross-sectional view of a conventional PMR writer showing the main pole structure, flux return pole, magnetic recording media, and coils that generate magnetic flux.

Referring to FIG. 1, a PMR head design is illustrated according to one embodiment of the present disclosure. There is a main pole structure 10 with a narrow write pole tip 10t hereafter referred to as a pole tip at an ABS 5, and a flux return pole (opposing pole) 8 which is magnetically coupled to the main pole layer through a return yoke 7. Magnetic flux (not shown) in the main pole structure 10 is generated by coils 6 and passes through the narrow pole tip into a magnetic recording media 4 and then back to the write head by entering the flux return pole 8. The main pole structure concentrates magnetic flux so that the magnetic field in the narrow pole tip 10t at the ABS is high enough to switch magnetizations in the recording media 4. A trailing shield (not shown) is preferably added to improve the field gradient in the down-track direction.

Figure 2:
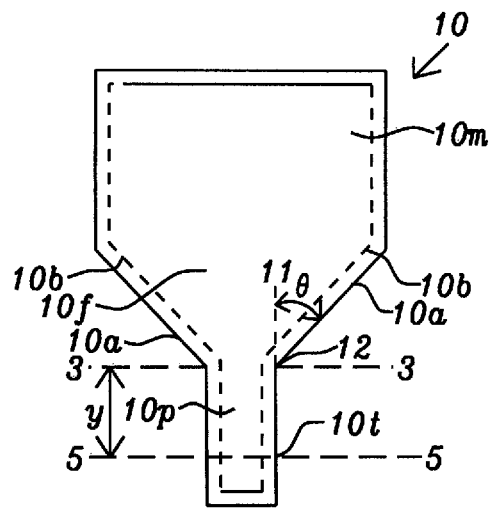
FIG. 2 is a top view showing one embodiment of a main pole structure with a narrow pole tip portion adjacent to the ABS, and a larger yoke portion with sides that flare outward at an angle θ from both sides of the narrow pole tip.

Referring to FIG. 2, a top view is shown of main pole structure 10 that has a large, wide back end portion 10m that is part of the yoke, a middle flared portion 10f that is also considered part of the yoke, and the narrow pole tip 10p that extends a neck height (NH) distance y from a front end at the ABS plane 5-5 to a back end along a plane 3-3 parallel to the ABS where the pole tip portion intersects the flared portion at the neck 12. The flare angle θ is determined by the angle between a dashed line 11 that is an extension of one of the rectangular sides of the pole tip and a side of the flared yoke portion. PMR technologies usually require the pole tip 10p at the ABS to have a beveled shape (as viewed from the ABS) so that adjacent track erasure (ATE) from the main pole tip edge at a non zero degree skew is minimized. In other words, the top edge 10a of the main pole structure 10 is usually larger than the lower edge 10b such that the top surface of the main pole structure has a larger area than the bottom surface.

Figure 3:
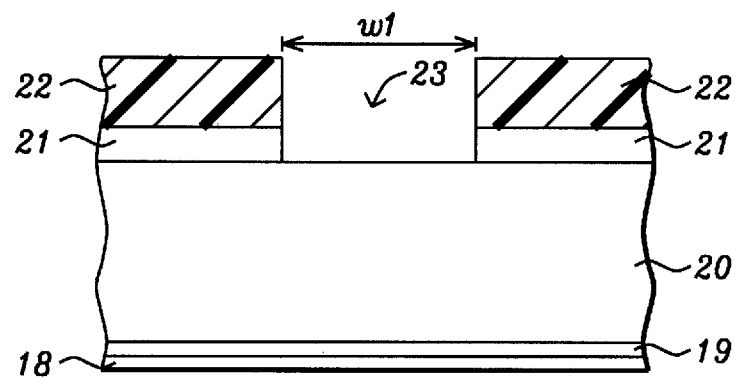
FIGS. 3-6 are cross-sectional views showing the fabrication of a main pole structure within an insulation layer at the ABS using an additive method.

FIGS. 3-6 are cross-sectional views from an ABS that relate to a process sequence that is practiced by the inventors and illustrate an additive method for forming a main pole structure. Referring to FIG. 3, a first step involved in forming an opening for a main pole layer is depicted. There is a substrate 18 such as AlTiC on which an etch stop layer 19 otherwise known as a etch resistant layer is deposited. The etch resistant layer 19 may be formed by a sputter deposition or PVD process, for example, and preferably comprises a material such as Ru or NiCr that has a high etch selectivity relative to an insulating layer made of alumina or the like during a subsequent etch process. In the exemplary embodiment, an insulation layer 20 is formed on the etch resistant layer 19 and is made of $Al_2O_3$, silicon oxide, or another dielectric material that is deposited by a PVD process, a sputtering technique, or the like.

In one embodiment, a hard mask 21 made of Ta, for example, is formed on the insulation layer 20. The hard mask is advantageously employed in a subsequent etch step where an opening is transferred into the insulation layer. Insulation layer 20 may be considered a mold forming layer and has a thickness essentially equivalent to the desired thickness of the main pole structure to be deposited in a later step. Photoresist layer 22 is coated on hard mask 21 and a well known lithography technique is used to form a pattern including an opening 23 that is preferably the shape in the cross-track direction of the main pole structure to be formed in subsequent steps. In one embodiment, opening 23 extends beyond a neck height distance from the ABS and also comprises a cavity (not shown) for the yoke portion of the main pole layer. The pattern including opening 23 in photoresist layer 22 is transferred through hard mask 21 by a first etching step that is preferably an ion beam etching (IBE) process to accurately reproduce the opening in the hard mask. The first etch stops on the insulation layer 20. Following the first etch step, the photoresist layer is stripped by a conventional method.

Figure 4:
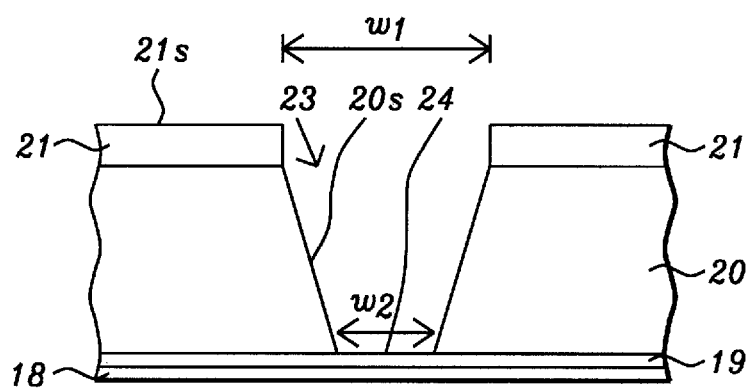

Referring to FIG. 4, a second etch step that preferably comprises reactive ion etch (RIE) conditions is performed to transfer the opening 23 through the insulation layer 20 and stops on etch resistant layer 19. Note the lower portion of opening 23 within insulation layer 20 has sloped sidewalls 20s that extend from a bottom surface of the hard mask 21 to the etch resistant layer 19. The slope of the sidewalls may be adjusted by changing RIE conditions such as gas chemistry, pressure, and RF power. As a result, the width $w_1$ at the top of opening 23 is greater than the width $w_2$ along the bottom surface 24. The second etch defines the shape and coarse cross-track dimension of the subsequently deposited main pole structure.

Figure 5:
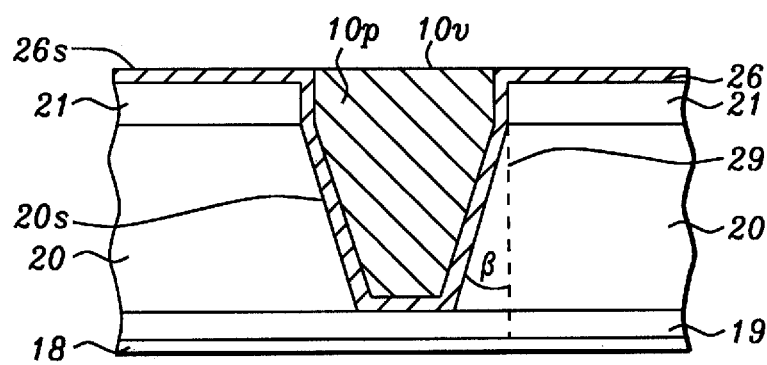

Referring to FIG. 5, a dielectric layer (not shown) may be deposited by an atomic layer deposition (ALD) method to form a conformal film on top surface 21s, on bottom surface 24, and along sidewalls 20s in opening 23 to adjust the width of opening 23 prior to seed layer deposition. A seed layer 26 that is preferably Ru is deposited by an ALD method, sputter deposition process, or another technique. Preferably, a deposition method is selected that forms a conformal seed layer 26 along sidewalls 20s and bottom surface 24. Sidewalls 20s are sloped at an angle 13 of about 5 to 20 degrees with respect to a plane 29 that is formed perpendicular to the etch resistant layer 19. As a result, the main pole structure which will be deposited in a later step will have a beveled shape with an angle β with respect to a plane formed perpendicular to the ABS so that unwanted skew related ATE can be suppressed. Substrate 18 is immersed in a plating solution and an electroplating process is performed to deposit a magnetic layer 10 that fills opening 23 (FIG. 4) and also covers a top surface 26s of seed layer 26. Alternatively, a sputter deposition method may be used.

Figure 6:
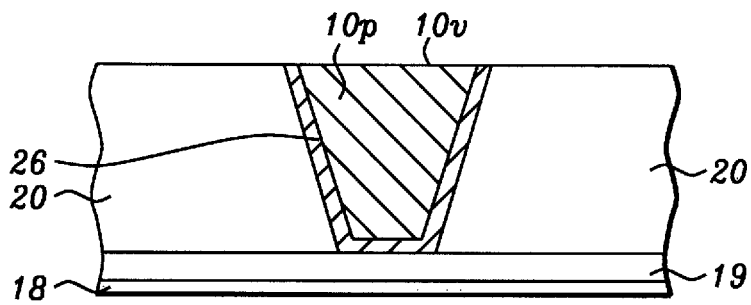

Referring to FIG. 6, a chemical mechanical polish (CMP) process is performed to form a planar top surface 10v on main pole structure 10 while removing the hard mask 21 and seed layer 26 adjoining the hard mask. Top surface 10v becomes coplanar with a top surface 20t of the adjoining insulation layer.

Figure 7A:
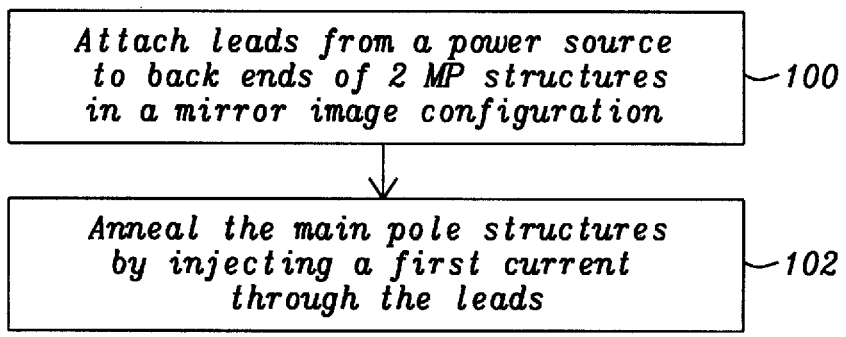
FIGS. 7a-7c are flow diagrams that list process steps in a sequence according to embodiments of the present disclosure where a main pole (MP) structure of a PMR write head is locally annealed in a narrow pole tip portion.
Figure 10:
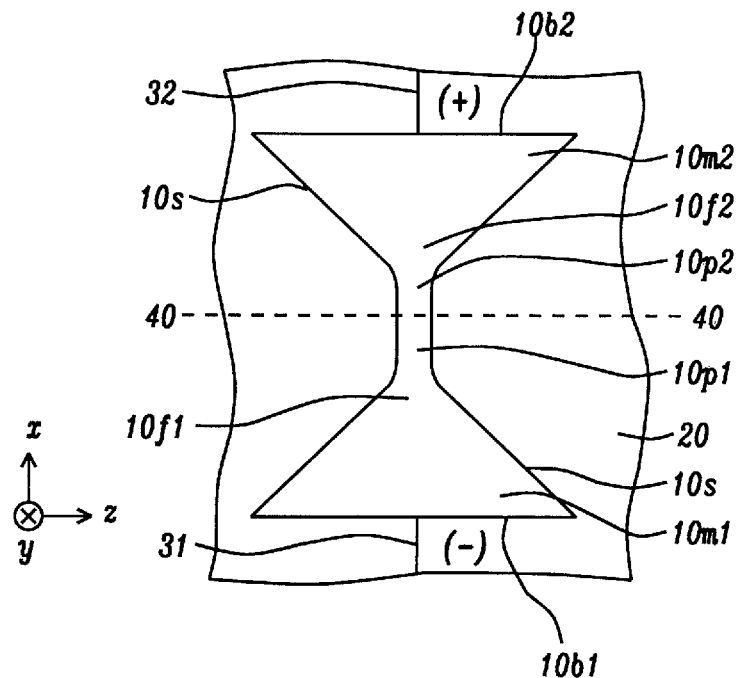
FIG. 10 is a top-down view of an annealing design with a dual main pole structure in a mirror image configuration showing a first lead attached to a back end of a first main pole structure and a second lead attached to a back end of a second main pole structure according to an embodiment of the present disclosure.

Referring to FIG. 7a, a flow chart is provided to illustrate a first process sequence according to the present disclosure where a main pole structure in a write head is locally annealed without substantially raising the temperature in other parts of a PMR head. This process flow begins after the main pole structure is formed according to an additive process such as the one described with respect to FIGS. 3-6. Preferably, two main pole structures are aligned front end to front end and joined by their narrow pole tip portions along a plane 40-40 in a mirror image configuration as depicted in FIG. 10. Each of the main pole structures may have a final shape such that no subsequent modifications of sidewalls, top or bottom surfaces will be performed. It should be understood that the substrate will eventually be cleaved along the plane 40-40 to generate two PMR write heads from each mirror image configuration, and said plane roughly approximates an ABS until a permanent position for the ABS is determined in a final lapping step that forms a front end facing the ABS on each narrow pole tip portion. Furthermore, there is an array of write heads on a substrate which means the configuration in FIG. 10 is repeated a plurality of times in rows and columns across the substrate. The structure in FIG. 10 will be described in more detail in a later section.

Returning to the process sequence in FIG. 7a, a lead is attached to a back end of each main pole structure in a PMR head array in step 100. A first lead is attached to a back end of one main pole structure that represents a positive terminal in the mirror image configuration (FIG. 10) while a second lead is attached to a back end of a second main pole structure that represents a negative terminal. As a result, a current may be injected in a subsequent step that flows from the first lead through the mirror image configuration to the second lead as indicated in step 102. The leads are connected to a power source. In step 102, a first current is injected through the mirror image configuration and selectively anneals the narrow pole tip portions $10p1$, $10p2$ in the main pole structures because of their substantially smaller volume and greater resistive heating than in the flared portions $10f1$, $10f2$ and in back end yoke portions $10m1$, $10m2$ as pictured in FIG. 10. In some embodiments, flared portions may be omitted so that the yoke portions with sidewalls $10s$ adjoin the narrow pole tip portions. In an embodiment where a DC current, AC current, or a pulsed current with an amplitude of 5 to 100 mA is injected into a back end of the first main pole structure in each mirror image configuration and exits through an end of the second main pole structure, resistive heating may effectively increase the temperature in pole tip portions $10p1$, $10p2$ up to 250° C. to 400° C. depending on the cross-sectional area of the pole tip portions, and the current magnitude.

Simulation of a current injection indicates that a current of about 10 mA applied for a period of 1 minute to about 2 hours is sufficient to raise the temperature of pole tip portions by 40° C. to 50° C. when the pole tip width is 45 nm, side gaps are each 50 nm, leading gap is 100 nm, neck height is 250 nm, and pole tip thickness is about 300 nm. Taking into account a temperature coefficient of resistivity (TCR) for a 24 kG high Bs material such as CoFe, CoNiFe, or FeNi, the actual input power under constant current mode will be higher than in the simulated results and thereby cause a larger temperature rise from a 10 mA current injection. It should be understood that a plurality of the individual main pole structures in a PMR head array may be annealed simultaneously by this method to improve throughput. Furthermore, the annealing process may be applied to a partially formed main pole structure in either an additive or subtractive fabrication process. For example, a trailing edge taper on the main pole structure may be formed after annealing. Additional sidewall shaping may occur after annealing in a subtractive process.

Figure 7B:
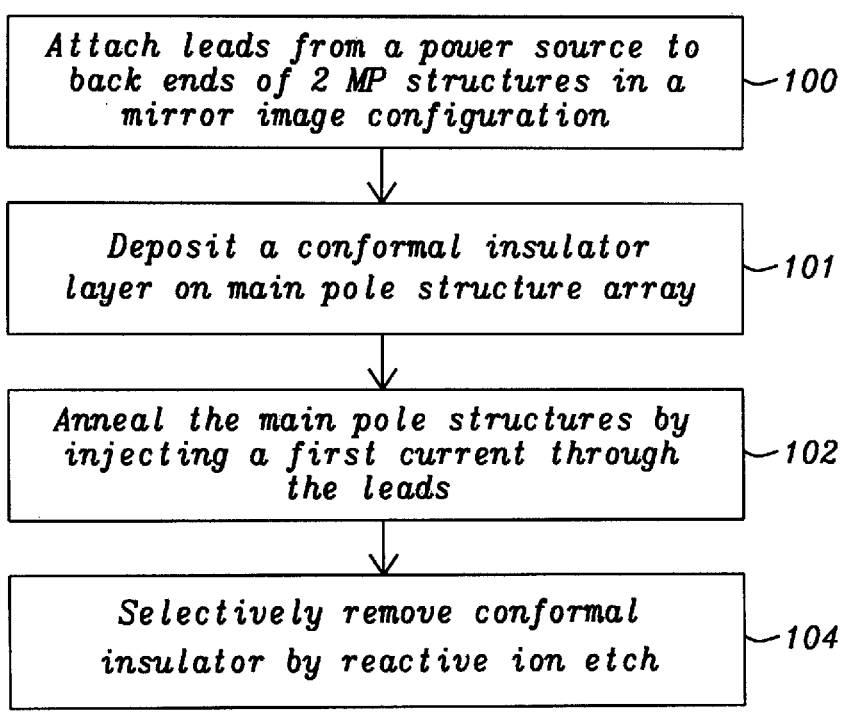

Referring to FIG. 7b, another embodiment comprises a second process flow wherein step 101 is included between steps 100 and 102. In step 101, an overcoat layer is deposited on the substrate with the PMR head array and covers a plurality of main pole structures. The overcoat layer 30 is made of silicon oxide or another dielectric material, and forms a conformal coating on insulation layer 20 and on the main pole structure including narrow pole tip section $10p$ along the ABS. The overcoat layer is used as a protection and heat dissipation layer during annealing and may also serve to prevent undesirable oxidation of the main pole structure during annealing. After steps 100-102 are performed in sequence, a fourth step 104 may be added to selectively remove the conformal insulator layer by a reaction ion etch Referring to FIG. 7c, a third process flow according to another embodiment of the present disclosure is illustrated. A key feature of the third process flow is insertion of step 103a before step 102 such that a first current is applied through the leads of the mirror image configuration to obtain a first resistance measurement that serves as a baseline figure for a second resistance measurement that is performed in step 103b following step 102. Thus, a first current is applied in step 103a, a second current is applied in step 102, and a third current that is preferably equivalent in magnitude to the first current is applied in step 103b. Steps 103a, 103b are used to probe the dual main pole mirror image configuration before and after annealing, respectively, with a current substantially less in magnitude than the annealing current in step 102. For example, if the second current in step 102 is 10 mA, the first and third currents in steps 103a-103b may be in the range of 0.5 to 1 mA. Steps 103a, 103b are advantageously employed to use the same circuit as in the annealing step to provide resistance measurements that enable the extent of annealing to be quantified. It should be understood that the difference between the first and second resistance measurements is related to the extent of annealing.

Step 104 may be included in the process flow and comprises a process to completely or partially remove the overcoat layer laid down in step 101. A reactive ion etch or a CMP process may be used to selectively remove the overcoat layer 30 without damaging insulation layer 20 that adjoins the sides of the main pole layer. For example, overcoat layer 30 may be removed except over the narrow pole tip section where it remains to serve as a write gap layer. Alternatively, step 104 may be omitted to leave the overcoat layer in place following the anneal step. In another aspect, both steps 101 and 104 may be omitted from the third process flow in FIG. 7c. Step 102 or the sequence 103a=>102=>103b may be repeated before step 104 is performed if a first sequence of 103a=>102=>103b indicates annealing is incomplete. Note that the full benefits of the annealing process of the present disclosure may be realized whether the process flow in FIG. 7a, FIG. 7b or FIG. 7c is followed.

Referring again to FIG. 10, the mirror image configuration formed during the PMR head fabrication sequence is shown from a top-down view and has an hour glass type structure with a first main pole structure with pole tip portion $10p1$ adjoining a second main pole structure with pole tip portion $10p2$ along a plane 40-40 that bisects the dual main pole structure along a cross-track direction. The first main pole structure has a yoke portion $10m1$ where a back side $10b1$ is connected by a first lead 31 to a power source (not shown). The second main pole structure has a yoke portion $10m2$ with a back side $10b2$ that is connected by a second lead 32 to the power source to complete a circuit and enable a current to flow through the dual main pole layer structure during an annealing step 102 (FIGS. 7a, 7b) or during the annealing step and probing step 103 as shown in the FIG. 7c embodiment. Preferably, leads are attached to all main pole back sides in a plurality of mirror image configurations in the PMR head array before proceeding to the next step in the anneal process sequence. During a final lapping step (not shown), the first main pole structure that comprises portions ($10p1+10m1+10f1$) will become part of a first PMR head while the main pole structure that comprises portions ($10p2+10m2+10f2$) will become part of a second PMR head.

Figure 7C:
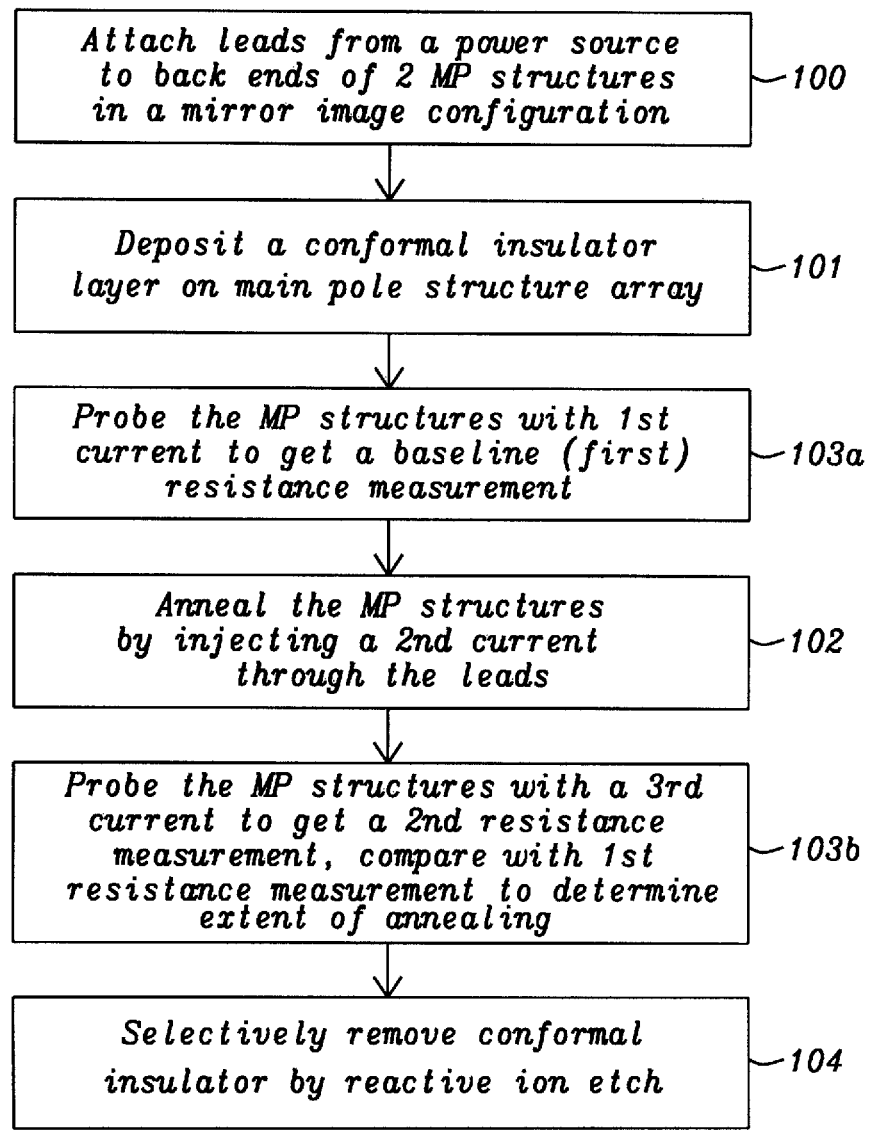
Figure 8:
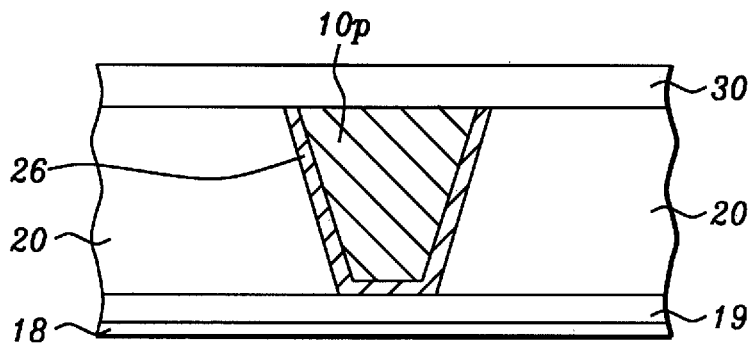
FIG. 8 is a cross-sectional view of the structure in FIG. 6 after an overcoat layer is formed over the main pole structure according to an embodiment of the present disclosure.

According to one embodiment, leads 31, 32 may be removed by an etch process, for example, following the process flow in FIG. 7a, FIG. 7b, or FIG. 7c. Optionally, the leads are buried in an insulation layer such as overcoat layer 30 (FIG. 8) and remain in the completed write head structure.

Figure 9:
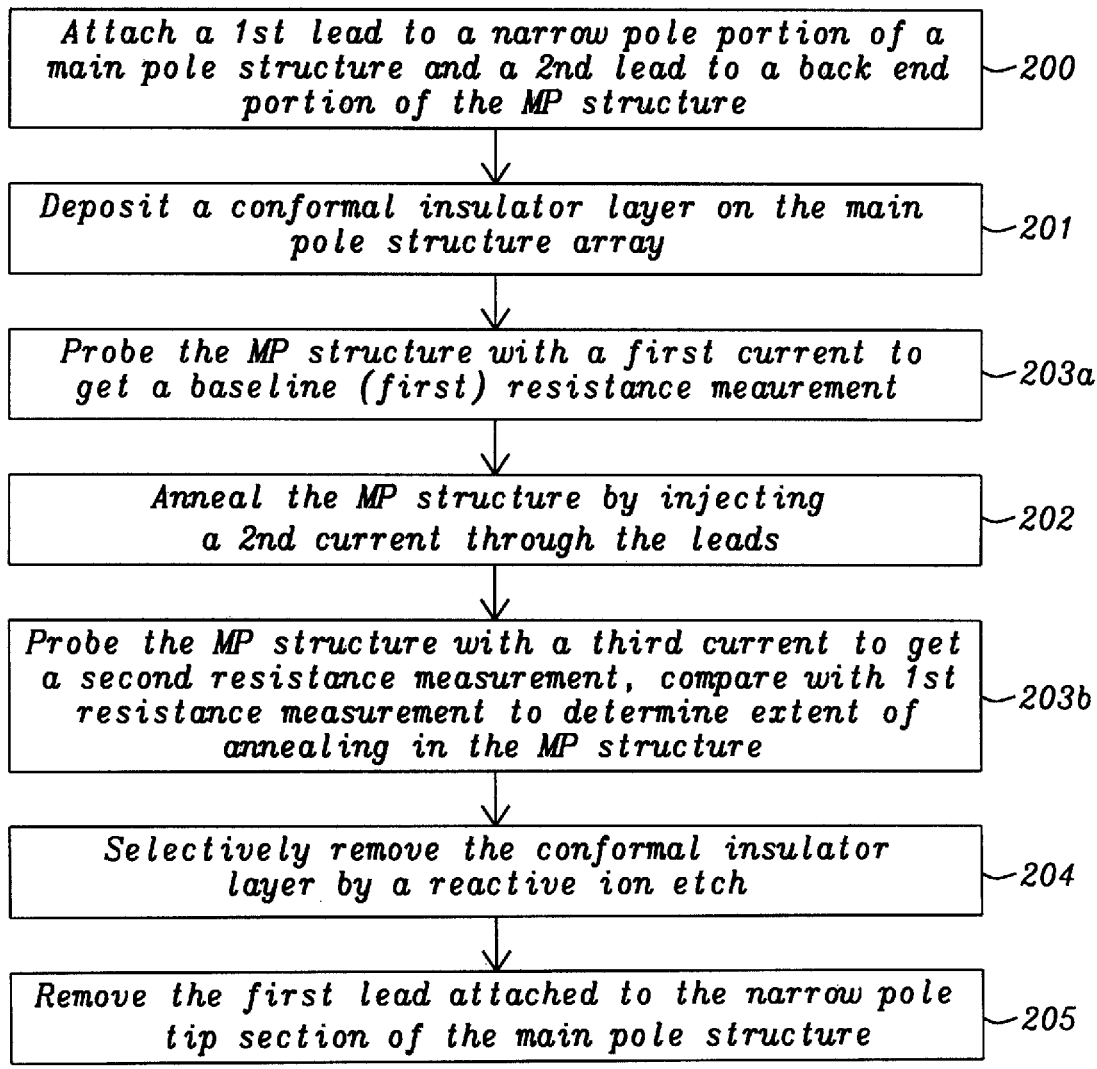
FIG. 9 is a flow diagram that illustrates the steps in a process sequence for locally annealing a main pole structure in a write head structure according to a second embodiment of the present disclosure.

Referring to FIG. 9, a fourth process flow for annealing a main pole structure in a write head is provided. A first step 200 involves connecting a pair of leads to a main pole structure wherein a first lead is attached to a back side of a yoke portion in a main pole structure while a second lead is attached to a narrow pole tip portion of the same main pole structure. The yoke portion is substantially wider in a cross-track direction than the narrow pole tip portion. In other words, only one main pole structure is annealed between each pair of leads rather than two in a mirror image configuration. A more detailed description is provided in a subsequent section relating to FIG. 11. In step 201, a conformal insulator (overcoat) layer is deposited on the main pole structure array to serve as a protection and heat dissipation layer. The protection aspect involves covering the main pole structure to avoid oxidation during the annealing step. Thereafter, in step 202, an annealing current is injected through the leads and has sufficient magnitude to cause resistive heating in the main pole structure, and especially in the narrow pole tip portion.

In one aspect, similar to the process flow in FIG. 7c, steps 203a, 203b in FIG. 9 may be employed to check the extent (effect) of annealing by injecting a first current before the annealing (second) current and a third current after the annealing current wherein each of the first and third currents have a magnitude substantially less than the annealing current to probe the voltage drop across the main pole structure. When a conformal insulating layer is formed on the main pole structure, step 204 may be added to selectively remove part or all of the conformal insulation layer. After annealing is completed, a final step 205 may be employed to remove the lead attached to the narrow pole tip portion by a slicing and/or lapping process, for example, while the second lead is buried in an insulation layer. However, both leads may be removed as in the first embodiment. One or more of steps 201, 203a, 203b and 204 may be omitted during the fourth flow sequence. Moreover, step 202 or the sequence 203a=>202=>203b may be repeated before step 204 is performed if the first sequence of 203a=>202=>203b shows the annealing to be incomplete. The annealing step may be performed before any additional write head layers are formed on the main pole structure. Alternatively, the annealing step may be performed after all of the write head layers are fabricated but before the lapping process.

Figure 11:
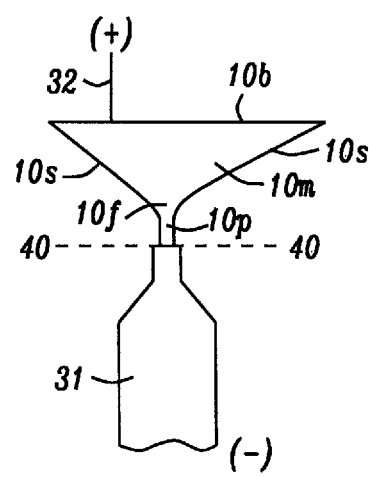
FIG. 11 is a top-down view of an annealing design according to another embodiment of the present disclosure.

According to another embodiment depicted in FIG. 11 and that is represented by the process flow diagram in FIG. 9, one of the two main pole structures in the mirror image configuration of the first embodiment is omitted. In this case, one lead 32 is attached to a main pole structure at a back side 10b while a second lead 31 forms an electrical connection to a front end of the narrow pole tip portion 10p that faces the eventual ABS proximate to plane 40-40. A substantially rectangular shape is pictured for the second lead 32 wherein a narrow end is attached to an end of the narrow pole tip portion. However, other shapes for the second lead are acceptable. Note that the first lead may have a similar shape (not shown) to that for second lead 32. Furthermore, the yoke 10m with sides 10s, and flared portion 10f adjoining the narrow pole tip may have a substantially triangular design as shown in FIG. 11. However, other main pole shapes used in the art may be employed without sacrificing any benefits gained from the annealing design disclosed herein.

To demonstrate the effectiveness of the annealing method of the present disclosure, a finite element method (FEM) simulation was performed. A thermo-electric analysis is able to directly calculate the voltage drop (thus DC resistance) and temperature rise from the joule heating caused by current injection through a first lead into a back end of a main pole structure, and current flow through a narrow pole tip portion to a second lead using an annealing structure similar to the one depicted in FIG. 11.

Figure 12:
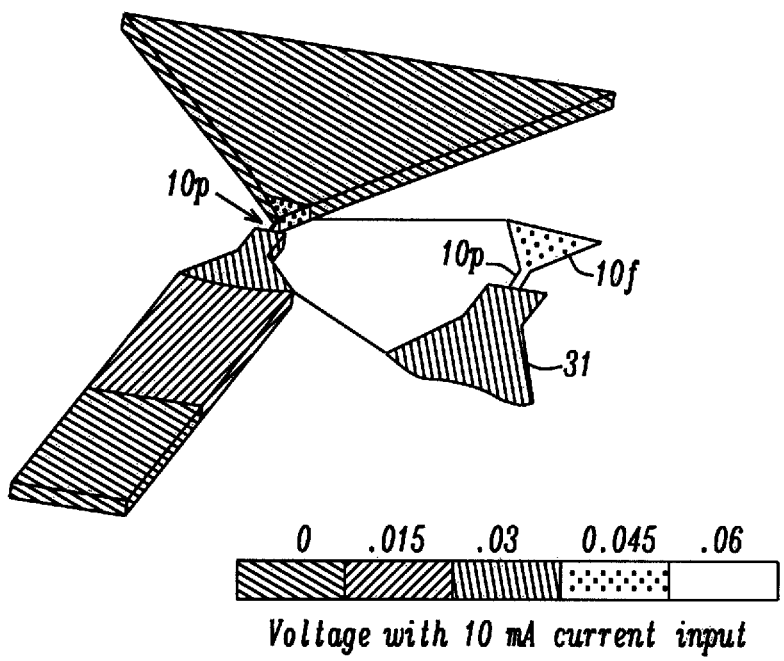
FIG. 12 shows an oblique view of a main pole structure during a model simulation of an annealing process of the present disclosure wherein a substantial voltage drop is shown in the narrow pole tip portion of the main pole structure during a 10 mA current injection.

Referring to FIG. 12, the voltage drop across a main pole structure is shown under conditions for an annealing process of the present disclosure. Only the lead attached to the narrow pole tip portion is illustrated. The resistivity for the main pole material made of a CoFeNi alloy or the like is assumed to be approximately 20 micro-ohm-cm. At one end of the lead and in the bulk of the main pole structure, there is little or no voltage drop. On the other hand, a significant voltage drop is observed in the narrow pole tip portion 10p of the main pole structure. The simulated results are based on a 10 mA current injection at the back end of the main pole structure, a narrow pole tip width of 45 nm with a 50 nm gap on each side, a narrow pole tip thickness of 300 nm, and a neck height of about 250 nm.

Figure 13:
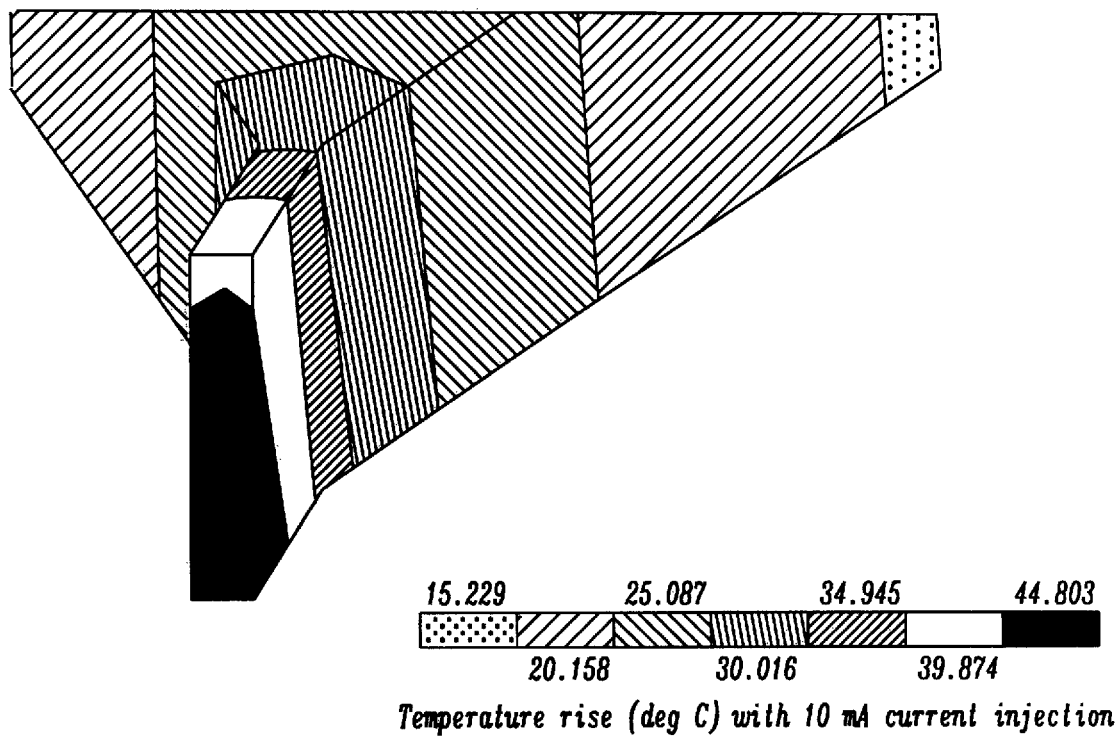
FIG. 13 is an oblique view of a main pole structure during simulation of an annealing process that illustrates a substantial temperature rise in the narrow pole tip portion as the result of resistive heating from a 10 mA current injection.

In FIG. 13, the temperature rise in the main pole structure in FIG. 12 is shown and indicates a temperature increase of 40° C. to 45° C. throughout most of the narrow pole tip portion as a result of a 10 mA injection. The temperature rise decreases as one moves away from the narrow pole tip portion of the main pole structure. Assuming a temperature coefficient of resistivity (TCR) of a 24 kG material to be of 0.3%/degree C., actual input power under constant current mode will be higher than shown in the simulation since the model did not account for an increase in resistivity at higher temperatures. If desired, even greater annealing temperatures may be achieved with one or both of higher current injection and smaller volume in the narrow pole tip portion where pole tip volume is determined by the thickness of the pole tip in a down-track direction, cross-track width, and neck height.

Figure 14:
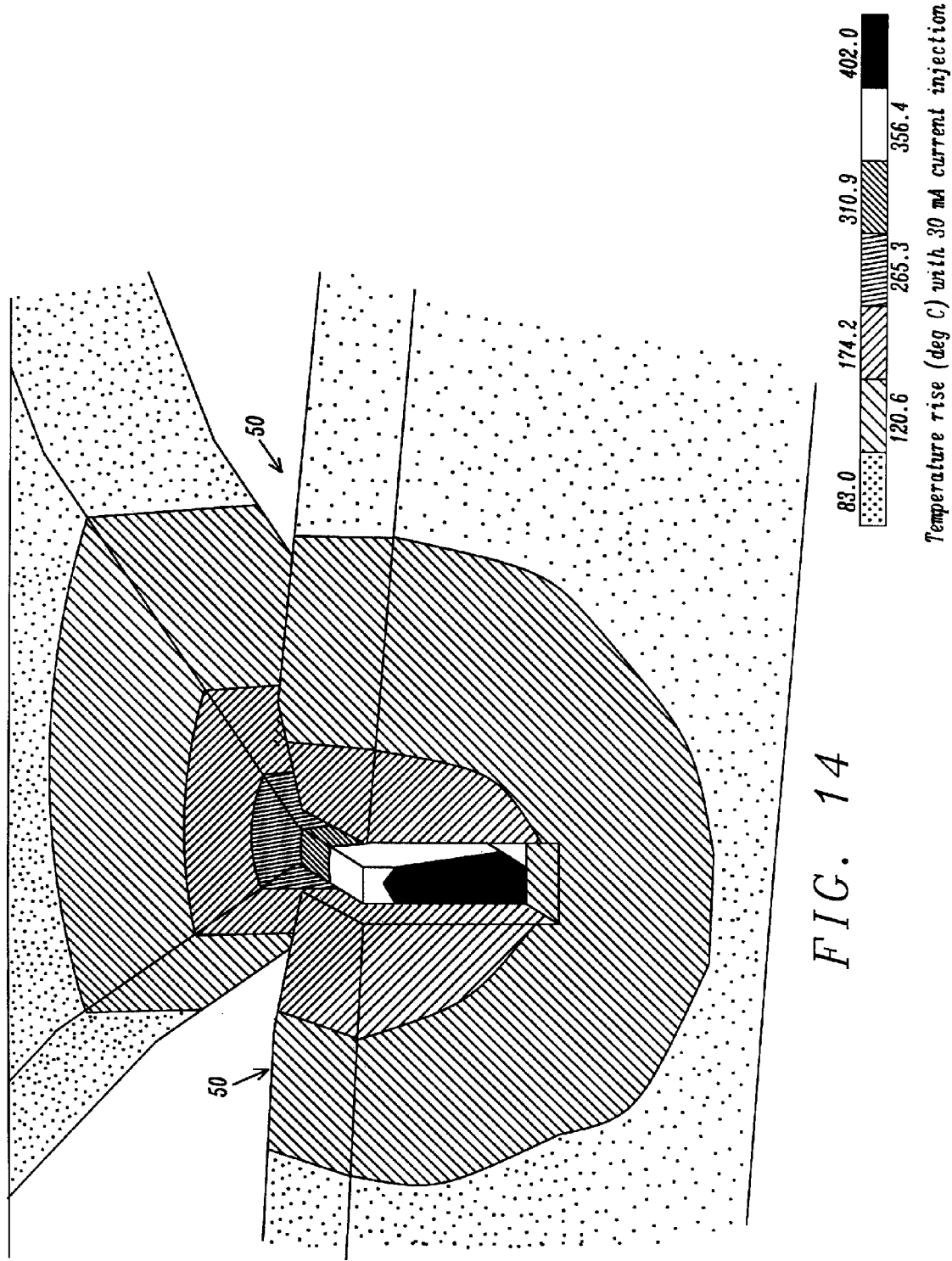
FIG. 14 illustrates a temperature rise in narrow pole tip portion of a main pole structure and in an adjacent shield structure as a result of an annealing process with a 30 mA current injection according to an embodiment of the present disclosure.

Referring to FIG. 14, temperature rise of 310° C. to 400° C. in the narrow pole tip portion of a main pole structure resulting from a 30 mA current injection is depicted. The pole tip has the same dimensions as indicated with respect to the pole tip structure in FIGS. 12-13. In this example, the temperature in nearby regions of a side shield structure 50 increases by about 200° C. or less. Only one main pole structure is shown to enable a clear view of the narrow pole tip portion. This simulation may apply to either of the annealing structure embodiments illustrated in FIG. 10 and in FIG. 11. As mentioned previously, two leads (not shown) are required to conduct a current through the main pole structure during the annealing step. According to one embodiment corresponding to the FIG. 10 configuration, a second main pole structure with a narrow pole tip portion may be connected to the narrow pole tip portion in FIG. 14. In that case, the temperature rise in the second main pole structure (not shown) would be a mirror image of the temperature profile for the FIG. 14 structure. Thus, in embodiments wherein the main pole structure is annealed before additional write head layers are formed on the main pole structure, the annealing process is compatible with a design having one or both of a side shield and a leading shield. In an embodiment wherein the annealing step is performed on a completed write head structure, the annealing process is compatible with one or more of a trailing shield, side shields, and a leading shield including a wrap around shield design.

An important feature in the process flow sequence described herein is that the current injection in step 102 or 202 generates a temperature in the narrow pole tip portion that is sufficiently high to anneal the seams therein and to relieve the stress that is caused by the manufacturing process, and in particular, during deposition of the magnetic material in the main pole structure. In general, an injection current in the range of 5 mA to 100 mA is considered to be of sufficient magnitude to generate an anneal temperature between 250° C. and 400° C. in the narrow pole tip portion for the purposes of the present disclosure. As a result, there is improved high frequency permeability for the main pole structure in the critical narrow pole tip portion that together with reduced defects and relieved stress leads to better writing performance.

The present disclosure has an advantage over prior art in that it provides a PMR write head wherein localized annealing in the main pole structure is accomplished without substantially raising the temperature in adjacent portions thereof. As a result, magnetic properties and structural integrity in the read head are not degraded. The annealing process may be performed simultaneously in a plurality of write heads on a substrate to improve throughput. The effect of the annealing may be detected in-situ by monitoring a resistance change between a first resistance measurement before the annealing current injection and a second resistance measurement following the annealing current injection. The process flow is flexible in that main pole annealing may be performed before any additional layers are formed on the main pole structure, or may be delayed until after the writer head fabrication is complete. For example, it is well known in the art that a trailing shield, flux return yoke, insulation layers, and one or more coil layers are typically formed on top of the main pole structure in a completed write head. In some embodiments, there may be an advantage to postponing the current injection (annealing) step until the write head is completely formed, or at an in-between step wherein the write head is partially completed.

While this disclosure has been particularly shown and described with reference to, the preferred embodiment thereof, it will be understood by those skilled in the art that various changes in form and details may be made without departing from the spirit and scope of this disclosure.

We claim:

1. A method for locally annealing a main pole structure in a write head, comprising:
    (a) providing a main pole structure on a substrate wherein the main pole structure comprises a narrow pole tip portion with a front end that adjoins a plane formed proximate to an eventual air bearing surface (ABS) plane, and a yoke portion that adjoins the pole tip portion along a back end at a plane that is a neck height distance from the eventual ABS plane;
    (b) attaching a first lead to a back side of the yoke portion to form a first terminal, and electrically connecting a second lead to the front end of the narrow pole tip portion to form a second terminal; and
    (c) injecting a first current through the first lead that passes through the main pole structure including the narrow pole tip portion and exits through the second lead thereby causing resistive heating to locally anneal the narrow pole tip portion without substantially elevating a temperature in adjacent layers of the write head.

2. The method of claim 1 further comprised of:
    (d) injecting a second current through the first lead that passes through the main pole structure and exits by way of the second lead to obtain a first resistance measurement before the first current is injected;
    (e) injecting a third current between the first and second leads and through the main pole structure after the first current is injected to obtain a second resistance measurement; and
    (f) determining the effect of annealing in the narrow pole tip portion by calculating a difference between the first and second resistance measurements.

3. The method of claim 2 wherein the second and third currents have an amplitude in the range of about 0.5 to 1 mA.

4. The method of claim 2 wherein a sequence of the second current injection followed by the first current injection, and then the third current injection is performed more than once.

5. The method of claim 1 further comprised of forming an overcoat layer made of an insulation material on the main pole structure, the overcoat layer serves to prevent oxidation of the main pole structure and dissipates heat during the first current injection.

6. The method of claim 1 wherein the first current is a DC current, AC current, or pulsed current with an amplitude of about 5 mA to 100 mA.

7. The method of claim 6 wherein a temperature of about 250° C. to 400° C. is generated in the narrow pole tip portion.

8. The method of claim 1 wherein local annealing is performed after the main pole structure is completely formed but before any additional write head layers are formed on the main pole structure.

9. The method of claim 1 wherein first current injection is performed after the write head is completely fabricated.

10. The method of claim 1 wherein local annealing is performed before the main pole structure is completely formed.

11. A method for locally annealing a main pole structure in a perpendicular magnetic recording (PMR) head that is formed on a substrate, comprising:
    (a) providing a dual main pole structure in a mirror image configuration wherein each main pole structure is formed with a first insulation layer on the substrate, and each main pole structure comprises a narrow pole tip portion with a front end that adjoins a plane formed proximate to an eventual air bearing surface (ABS) plane, the narrow pole tip portion has a back end along a plane that is a neck height distance from the front end and adjoins a yoke portion;
    (b) attaching a first lead to a back side of the yoke portion in a first main pole structure to form a positive terminal, and attaching a second lead to a back side of a yoke portion in a second main pole structure to form a negative terminal; and
    (c) injecting a first current through the first lead that passes through the dual main pole structure including the narrow pole tip portions before exiting the second lead thereby causing resistive heating to locally anneal the narrow pole tip portions of the first and second main pole structures without substantially elevating a temperature in adjacent regions of the PMR head.

12. The method of claim 11 further comprised of:
    (d) injecting a second current through the first lead that passes through the dual main pole structure and exits by way of the second lead to obtain a first resistance measurement before the first current is injected;
    (e) injecting a third current between the first and second leads and through the dual main pole structure after the first current is injected to obtain a second resistance measurement; and
    (f) determining the effect of localized annealing in the narrow pole tip portions by calculating a difference between the first and second resistance measurements.

13. The method of claim 12 wherein the second and third currents have an amplitude in the range of about 0.5 to 1 mA.

14. The method of claim 12 wherein a sequence of the second current injection followed by the first current injection, and then the third current injection is performed more than once.

15. The method of claim 11 further comprised of forming an overcoat layer made of an insulation material on the dual main pole structure before injecting the first current.

16. The method of claim 11 wherein the first current is a DC current, AC current, or pulsed current with an amplitude of about 5 mA to 100 mA.

17. The method of claim 16 wherein a temperature of about 250° C. to 400° C. is generated in the narrow pole tip portions of the main pole structures.

18. The method of claim 11 wherein the local annealing is performed after the main pole structures are completely formed but before any additional PMR head layers are formed on the dual main pole structure.

19. The method of claim 11 wherein injecting the first current is performed after the PMR head is completely fabricated.

20. The method of claim 11 wherein the local annealing is performed before the PMR head is completely formed.

* * * * *